US012221290B2

(12) United States Patent
Chien et al.

(10) Patent No.: US 12,221,290 B2
(45) Date of Patent: Feb. 11, 2025

(54) METHOD, SYSTEM AND APPARATUS FOR DETECTING CONTAINER TRANSITION EVENTS

(71) Applicant: ZEBRA TECHNOLOGIES CORPORATION, Lincolnshire, IL (US)

(72) Inventors: Chih Huan Chien, Vernon Hills, IL (US); Jay J. Williams, Glenview, IL (US); Bassam S. Arshad, Wheeling, IL (US); Yan Zhang, Buffalo Grove, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 974 days.

(21) Appl. No.: 17/200,478

(22) Filed: Mar. 12, 2021

(65) Prior Publication Data

US 2022/0289493 A1 Sep. 15, 2022

(51) Int. Cl.
*B65G 43/08* (2006.01)
*B65G 1/04* (2006.01)

(52) U.S. Cl.
CPC .......... *B65G 43/08* (2013.01); *B65G 1/0407* (2013.01); *B65G 2203/0241* (2013.01); *B65G 2203/0283* (2013.01); *B65G 2203/041* (2013.01)

(58) Field of Classification Search
CPC ................. B65G 43/08; B65G 1/0407; B65G 2203/0241; B65G 2203/0283; B65G 2203/041; B65G 43/00; B65G 67/04
See application file for complete search history.

(56) References Cited

U.S. PATENT DOCUMENTS 10,362,443 B2 * 7/2019 Yoon ...................... G06Q 50/10

FOREIGN PATENT DOCUMENTS

JP 2022028342 A * 2/2022

OTHER PUBLICATIONS

PE2E JP 2022028342.*
JP202202834 EN translation spec-espacenet.*

* cited by examiner

*Primary Examiner* — Jacob S. Scott
*Assistant Examiner* — Erin Morris

(57) ABSTRACT

A method includes: obtaining, from a sensor disposed on a transporter, a set of beacon identifiers and proximity indicators, the beacon identifiers emitted by respective beacons mounted proximate to a boundary separating an exterior of a container from an interior of the container; determining whether the set of beacon identifiers and proximity indicators indicates a transition of the transporter across the boundary; when the determination is affirmative, detecting, based on the set of beacon identifiers and proximity indicators, a direction of travel of the transporter relative to the boundary; and generating a transition event including an identifier of the transporter, an identifier of the container, and the direction of travel.

21 Claims, 6 Drawing Sheets

METHOD, SYSTEM AND APPARATUS FOR DETECTING CONTAINER TRANSITION EVENTS

BACKGROUND

Various processes in material handling facilities, such as warehouses and the like, may be controlled based on the presence or absence of material handling vehicles such as forklifts at containers. Image or depth-based detection of such vehicles, however, may be computationally demanding.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
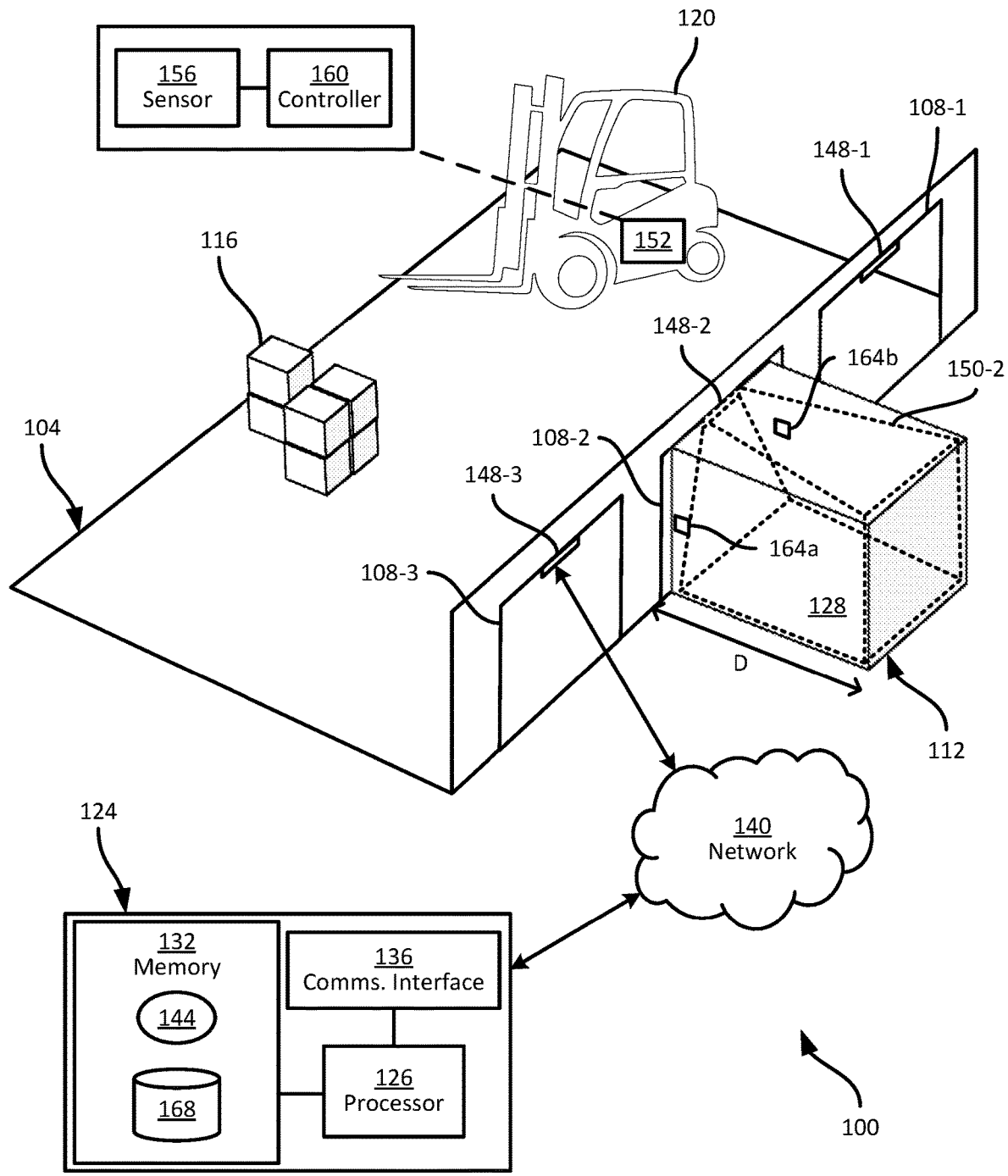
FIG. 1 is a diagram of a system for detecting container transition events.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining, from a sensor disposed on a transporter, a set of beacon identifiers and proximity indicators, the beacon identifiers emitted by respective beacons mounted proximate to a boundary separating an exterior of a container from an interior of the container; determining whether the set of beacon identifiers and proximity indicators indicates a transition of the transporter across the boundary; when the determination is affirmative, detecting, based on the set of beacon identifiers and proximity indicators, a direction of travel of the transporter relative to the boundary; and generating a transition event including an identifier of the transporter, an identifier of the container, and the direction of travel.

Additional examples disclosed herein are directed to a computing device, comprising: a controller configured to: obtain, from a sensor disposed on a transporter, a set of beacon identifiers and proximity indicators, the beacon identifiers emitted by respective beacons mounted proximate to a boundary separating an exterior of a container from an interior of the container; determine whether the set of beacon identifiers and proximity indicators indicates a transition of the transporter across the boundary; when the determination is affirmative, detect, based on the set of beacon identifiers and proximity indicators, a direction of travel of the transporter relative to the boundary; and generate a transition event including an identifier of the transporter, an identifier of the container, and the direction of travel.

Further examples disclosed herein are directed to a system, comprising: a plurality of beacons mounted proximate to a boundary separating an exterior of a container from an interior of the container; a sensor mounted to a transporter; and a controller coupled to the sensor and configured to: obtain, from a sensor disposed on a transporter, a set of beacon identifiers and proximity indicators, the beacon identifiers emitted by the beacons; determine whether the set of beacon identifiers and proximity indicators indicates a transition of the transporter across the boundary; when the determination is affirmative, detect, based on the set of beacon identifiers and proximity indicators, a direction of travel of the transporter relative to the boundary; and generate a transition event including an identifier of the transporter, an identifier of the container, and the direction of travel.

FIG. 1 depicts a container loading and unloading system 100, e.g. disposed in a facility 104 such as a warehouse, a manufacturing facility, a retail facility, or the like, only a portion of which is shown in FIG. 1. The facility 104 includes at least one load bay 108, disposed at a cross dock or other suitable portion of the facility 104. In the illustrated example, three load bays 108-1, 108-2, and 108-3 are shown. The load bays 108 may, for example, be arranged along an outer wall of the facility 104, providing openings in the wall such that containers can approach the load bays 108 from the exterior of the facility 104, e.g. transported by semi-trailers or the like. In other examples, the load bays 108 may be internal to the facility 104, e.g. implemented as a load station to load or unload containers that are handled within the facility, such as unit loading devices (ULDs) or the like. As will be apparent, the system 100 can include greater or smaller numbers of load bays 108 than are illustrated in FIG. 1.

FIG. 1 also illustrates a container 112 at the load bay 108-2, e.g. awaiting the loading of items 116 into the container 112, or the removal of items within the container 112 into the facility 104. Loading and unloading of items 116 into or out of the container 112 may be performed by a transporter 120, such as a forklift. Various other transporters may be employed in addition to or instead of the forklift, including human workers, autonomous transporters, and the like.

As will be apparent, to load or unload items 116 into or out of the container 112, the transporter 120 enters and exits the container 112. Multiple transporters 120 may be deployed in the facility 104, and more than one transporter 120 may be assigned to work at a given container 112 during the loading or unloading of that container. The allocation of transporters to containers 112 may be performed by a scheduling controller, e.g. implemented by a computing device 124, which may also be referred to as a server 124.

The server 124 includes a central processing unit (CPU), also referred to as a processor 126 or a controller, interconnected with a non-transitory computer readable storage medium, such as a memory 132. The memory 132 includes any suitable combination of volatile (e.g. Random Access Memory (RAM)) and non-volatile (e.g. read only memory (ROM), Electrically Erasable Programmable Read Only Memory (EEPROM), or flash) memory. The processor 126 and the memory 132 each comprise one or more integrated circuits (ICs).

The server 124 also includes a communications interface 136, enabling the server 124 to exchange data with other computing devices, e.g. via a network 140 such as a wired and/or wireless local area network (LAN) or the like. The communications interface 136 therefore includes any suitable hardware (e.g. transmitters, receivers, network interface controllers and the like) allowing the server 124 to communicate over the network 140.

The memory 132 stores a plurality of computer-readable instructions, e.g. in the form of a scheduling application 144. The application 144 is executable by the processor 126 to receive or otherwise obtain data indicating which load bays 108 are occupied (i.e. have a container 112 at the load bay 108, as in the case of the load bay 108-2), which items 116 are to be loaded or unloaded to which load bays 108, and the like. Execution of the application 144 further enables the server 124 to use the above information to allocate transporters to load bays 108. The server 124 may also use additional information in the above-mentioned allocation, such as a current fullness of each container 112. The fullness of a container 112 is an indication of what portion of the volume of an interior 128 of the container 112 is occupied by items. The fullness may be compared, for example, to a target fullness and based on that comparison the server 124 may determine whether to allocate additional transporters 120 to the container 112. The processor 126, as configured via execution of the application 144, may also be referred to as a scheduling controller.

The server 124 can obtain the current fullness of the container 112 by controlling a sensor assembly 148 disposed at the corresponding load bay 108. Each of the sensor assemblies 148-1, 148-2, and 148-3 can include at least one image and/or depth sensor, such as an RGB camera and/or a depth camera. In other examples, the sensor assemblies 148 can include lidar sensors, ultrasound sensors, and the like. Each sensor assembly 148 is positioned at the corresponding load bay 108 such that a field of view (FOV) 150 (the FOV 150-2 of the sensor assembly 148-2 is shown in FIG. 1) is aimed outwards from the load bay 108, into the interior 128 of the container 112.

The sensor assembly 148-2 is therefore controllable, e.g. by the server 124, to capture sensor data such as images and/or depth measurements (e.g. point clouds) corresponding to the interior 128 of the container 112. The server 124, in turn, can process the sensor data to determine the current fullness of the container 112, and/or other information. As will be apparent to those skilled in the art, the collection and processing of the images and/or depth measurements from the sensor assemblies 148 may be computationally intensive, as well as imposing a substantial load on the network 140. If the sensor assembly 148-2 is operated to capture data for processing by the server 124 continuously during the loading or unloading of the container 112, at least some of the captured data may be captured while the transporter 120 is inside the container 112, e.g. depositing or retrieving items 116. The presence of the transporter 120 in the container 112 may complicate or prevent the determination of a fullness measurement. Therefore, capturing data at the sensor assembly 148-2, transmitting the data to the server 124 via the network 140, and processing the data at the server 124 during times that the transporter 120 is inside the container 112 may be an ineffective use of network bandwidth and computational resources. The server 124 may be configured to detect the transporter 120 itself from the data captured by the sensor assemblies 148, in order to determine when the transporter 120 has left a container 112. However, such a determination is computationally intensive itself, and therefore has little or no impact to mitigate the consumption of resources resulting from continuous processing of the data gathered by the sensor assemblies 148.

The system 100 includes additional components and functionality to mitigate the inefficient resource usage noted above when the transporter 120 is inside the container 112. In particular, the system 100 includes a client computing device 152 mounted on the transporter 120, which may also be referred to as an edge device 152. The edge device 152 includes a proximity sensor 156 coupled to a controller 160. The proximity sensor 156 can be, for example, a Bluetooth transceiver (e.g. a BLE transceiver). The controller 160, which may be integrated with the sensor 156 or implemented as a separate integrated circuit from the sensor 156, is configured to process data detected by the sensor 156, and transmit information derived therefrom to the server 124, e.g. via the network 140. To that end, the edge device 152 can also include a communications interface such as a WiFi transceiver or the like. In some examples, the edge device 152 can be implemented as a smart phone, tablet computer or the like. In other examples, the edge device 152 can be a comparatively simple, inexpensive device with limited capabilities beyond the above-mentioned detection and processing of signals such as BLE signals.

In addition, the container 112 is equipped with a plurality of wireless beacons 164, such as BLE beacons. In the present example, the container 112 includes two beacons 164a and 164b, although in other examples the container 112 may include more than two beacons 164. The beacons 164 are affixed to the container 112, e.g. on inside walls thereof, at predetermined positions relative to the entrance of the container 112, which represents a boundary between the interior 128 of the container 112 and the exterior of the container (e.g. the interior of the facility 104). In the illustrated example, the beacons 164a and 164b are mounted adjacent to the above-mentioned boundary, at an equal depth (as measured on the axis "D" shown in FIG. 1) within the container 112. In other examples, however, the beacons 164 may be mounted further inside the container 112 (i.e. at a greater depth), or at different depths, so long as the depth of each beacon 164 is a predetermined value available to the edge device 152 and/or the server 124. In further examples, the beacons 164 are mounted at the load bay 108 itself, e.g. on the walls of the load bay 108. More generally, the beacons 164 are mounted proximate to the boundary between the interior and exterior of the container 112, at least when the container 112 is at the load bay 108.

The beacons 164, which may be battery-powered, are configured to periodically emit beacons containing a unique beacon identifier. The edge device 152, via the sensor 156, is configured to detect the beacons, and to provide the beacon identifiers contained therein to the controller 160. The sensor 156 or the controller 160 can also determine a proximity indicator from each beacon, such as a received signal strength indicator (RSSI) that indicates how close the beacon is to the sensor 156. Using the beacon identifiers and the proximity indicators, the controller 160 or the server 124 can determine whether the transporter 120 has crossed a boundary dividing the interior 128 of the container 112 from the facility 104. The controller 160 or the server 124 can further determine whether the above boundary transition represented the transporter 120 entering or exiting the container 112. That is, the controller 160 or the server 124 can determine a direction of travel of the transporter 120 across the boundary. As a result, it can be determined whether the interior 128 of the container 112 is currently obstructed by the transporter 120, and activation of the sensor assembly 148 can be controlled, e.g. to occur only when the transporter 120 is not inside the container 112.

The server 124 also stores, in the memory 132, a repository 168 mapping each beacon 164 to a corresponding load bay 108 and/or container 112, as well as mapping each sensor assembly 148 to a corresponding load bay 108. The repository 168 enables the server 124 to correlate reported beacons and/or transition events detected by the edge device 152 to a particular load bay 108, and also to activate the appropriate sensor assembly 148, e.g. when the transporter 120 has exited the container 112.

Figure 2:
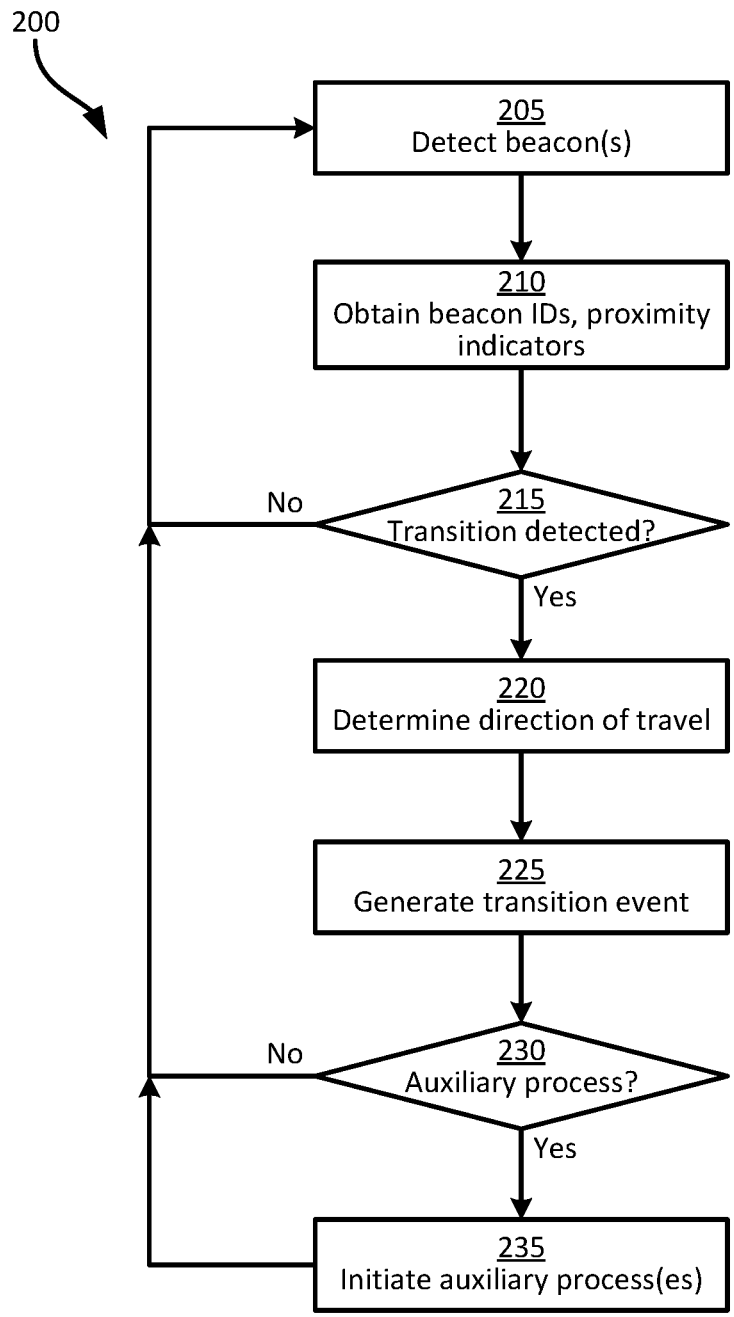
FIG. 2 is a flowchart of a method of detecting container transition events.

Turning to FIG. 2, a method 200 of detecting transition events is illustrated. The method 200 will be discussed below in conjunction with its example performance in the system 100. In particular, certain blocks of the method 200 may be performed by either of the edge device 152 and the server 124, while other blocks of the method 200 are performed by a specific one of the edge device 152 and the server 124, as noted in the discussion below.

At block 205, the edge device 152, and in particular the sensor 156, detects one or more beacon signals emitted by the beacons 164. As noted above, the beacons 164 may emit beacon signals periodically, e.g. every two seconds, or at any other suitable interval. The edge device 152 can initiate a performance of the method 200 at block 205 each time a beacon signal is received, and previous beacon signals may also be stored by the controller 160, for use as discussed below.

The beacon signals detected at block 205 each include at least a beacon identifier. Each beacon 164 stores a respective beacon identifier, which distinguishes the beacon 164 from other beacons 164 in the system 100. The sensor 156 also generates, at block 205, a proximity indicator for each beacon signal. As noted earlier, the proximity indicator can be an RSSI value derived from the beacon signal, and therefore increases as the distance between the beacon 164 and the sensor 156 decreases. In addition, each beacon signal may contain a timestamp indicating the time at which the beacon signal was emitted. The sensor 156 may also associate a received timestamp with each detected beacon signal.

At block 210, the controller 160 obtains the beacon identifiers and proximity indicators from the sensor 156. The controller 160 is then configured to process the beacon identifiers and proximity indicators to detect transition events associated with the transporter 120, as discussed below. In some examples, the performance of block 210 can include transmission of the beacon identifiers and proximity indicators from the edge device 152 to the server 124. Thus, at block 210 both the device 152 and the server 124 may obtain the beacon identifiers and proximity indicators. Either the controller 160 or the server 124 may therefore be configured to perform the analysis at blocks 215, 220, and 225. In the discussion below, the controller 160 is assumed to perform blocks 215, 220, and 225.

At block 215, the controller 160 is configured to determine whether the beacon identifiers and proximity indicators from block 210 are indicative of the transporter 120 crossing a boundary separating the interior 128 of the container 112 from the facility 104 (i.e. crossing the entrance to the container 112). The determination at block 215 is affirmative regardless of which direction the boundary is crossed in (i.e. whether the transporter 120 enters or exits the container 112). The determination at block 215 includes determining whether at least a threshold number (also referred to as a count threshold) of the proximity indicators at least meet a proximity threshold. In other words, the controller 160 can select a subset of the beacon signals from block 210 with proximity indicators that exceed the proximity threshold. The controller 160 can then determine whether the number of beacon signals in that subset exceeds the threshold number.

In this example, the threshold number of beacon signals above the proximity threshold that indicates a boundary transition is two. Specifically, because the beacons 164 are disposed at or near the entrance to the container 112, the sensor 156 may detect a single beacon signal that exceeds the proximity threshold as the transporter 120 travels through the facility 104 past the container 112. However, if both beacons 164 are detected to be sufficiently close to the sensor 156, the transporter 120 may be safely assumed to be traveling through the boundary between the container interior 128 and the facility 104, i.e. in between the beacons 164.

As will be apparent, the beacon signals may not be emitted by the beacons 164 simultaneously, and may not be detected by the sensor 156 simultaneously. The above-mentioned subset of beacon signals selected for the determination at block 215 may therefore be selected within a predefined time period, such as the previous one second or other suitable period. In other examples, the controller 160 can generate a proximity profile for each beacon 164, based on the current beacon signal(s) detected at block 205 and previously detected beacon signals from the same beacons 164 at previous performances of block 205. The profile for each beacon 164 can plot the proximity indicator for that beacon 164 over time, and the determination at block 215 can therefore be based on proximity indicators interpolated between two distinct beacon signals for a specific point in time.

Figure 3:
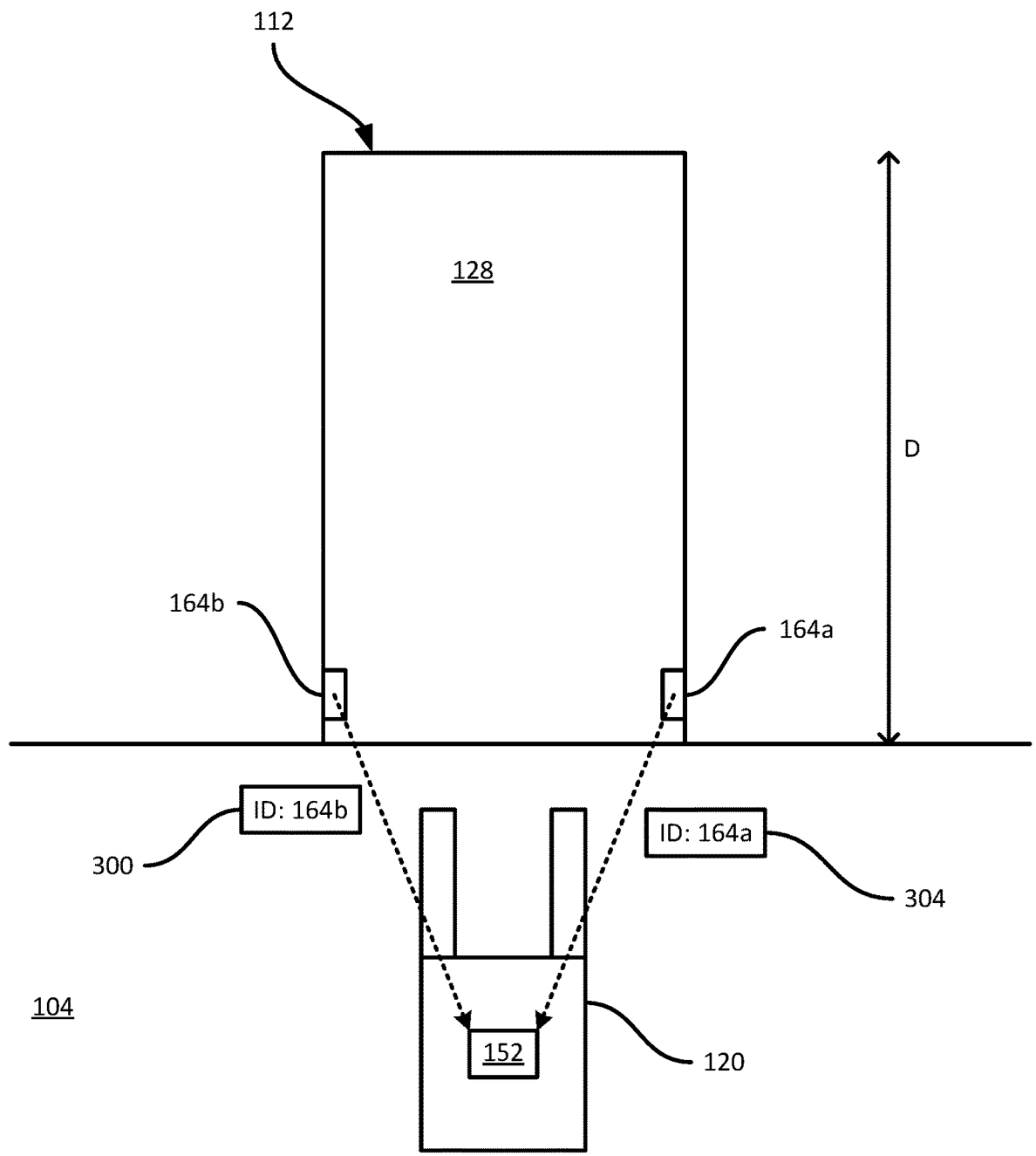
FIG. 3 is a diagram illustrating an example performance of blocks 205-215 of the method of FIG. 2.

Turning to FIG. 3, an overhead view of a portion of the facility 104 and the container 112 is shown, in which the transporter 102 has approached the container 112. The sensor 156 of the edge device 152 detects, at block 205, a beacon signal 300 emitted by the beacon 164*b*, and a beacon signal 304 emitted by the beacon 164*a*. As shown in FIG. 3, the beacon signals 300 and 304 contain identifiers of the respective beacons 164*b* and 164*a*, and the edge device 152 generates proximity indicators corresponding to each beacon signal 300 and 304. In this example, it is assumed that the transporter 120 is too distant from either beacon 164 for the above-mentioned proximity threshold to be met. The determination at block 215 is therefore negative, and the edge device 152 returns to block 205.

Figure 4:
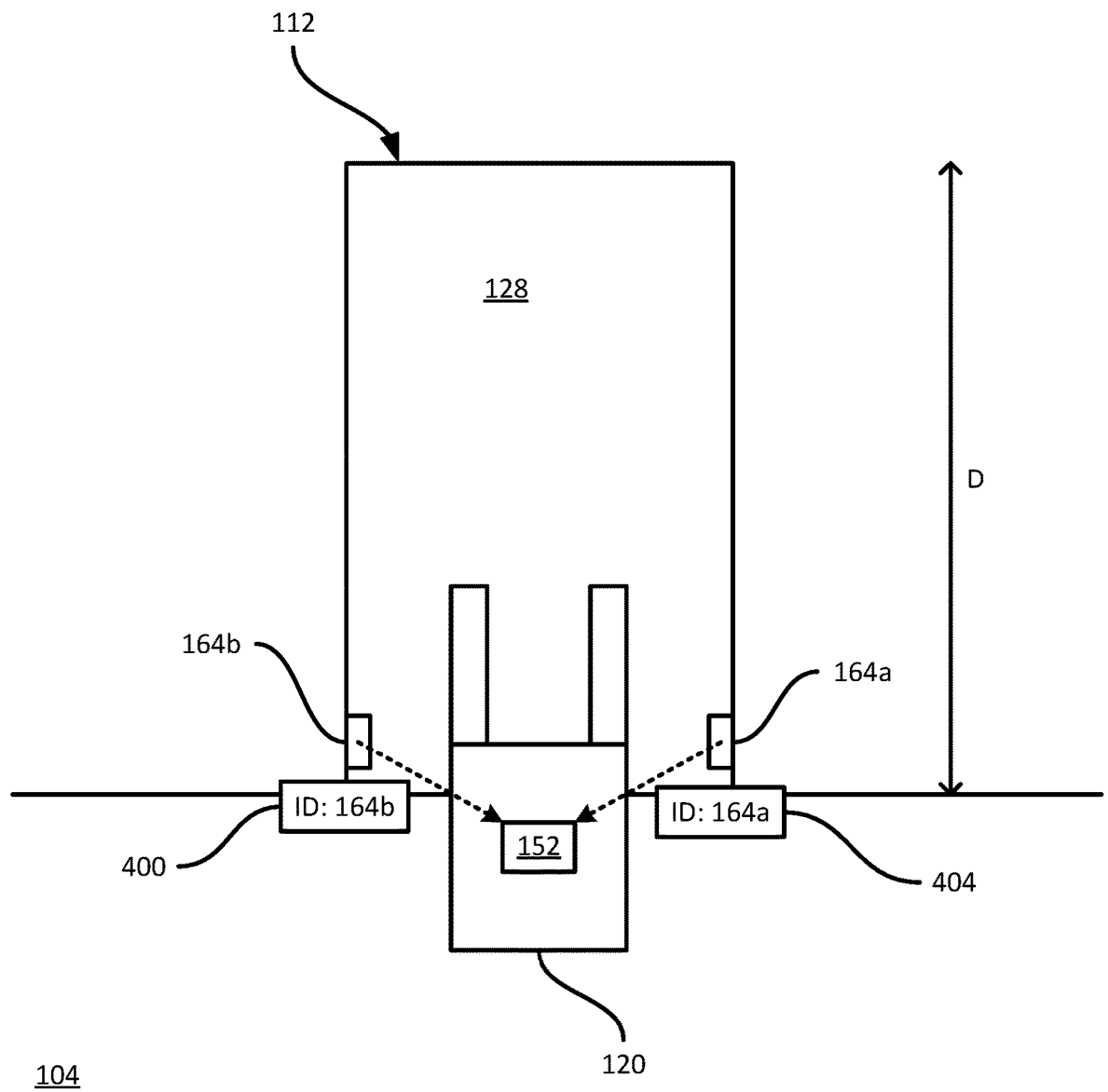
FIG. 4 is a diagram illustrating another example performance of blocks 205-215 of the method of FIG. 2.

FIG. 4 illustrates a further performance of block 205, at which the sensor 156 detects further beacons 400 and 404 emitted by the beacons 164*b* and 164*a*, respectively. As seen in FIG. 4, the edge device 152 (and therefore the sensor 156) is closer to the beacons 164 that in FIG. 3. It is assumed that the proximity indicators corresponding to both of the beacon signals 400 and 404 are above the proximity threshold. In addition, therefore, the number of beacons 164 for which the proximity threshold is met (i.e. two in this example) meets the threshold number. In other words, the fact that two beacons satisfy the proximity threshold indicates that the transporter is crossing the boundary between the facility 104 and the container 112, and the determination at block 215 is affirmative.

Following an affirmative determination at block 215, at block 220 the controller 160 is configured to determine a direction of travel of the transporter 120. As will be apparent from FIGS. 3 and 4, the sensor 156 may pass close to the beacons 164 both on entering and on exiting the container 112. An affirmative determination at block 215 indicates that the transporter 120 is transitioning between the interior 128 of the container 112 and the facility 104, but not in which direction.

The determination at block 220 can take various forms. In some examples, the controller 160 is configured to compare the set of beacon identifiers that resulted in the affirmative determination at block 215 to stored sets of beacon identifiers from previous affirmative determinations at block 215, e.g. over a predefined historical time period (e.g. the previous 60 seconds). If the set of beacon identifiers that resulted in the affirmative determination at block 215 appears in the stored set, indicating that the same set has resulted in a positive determination at block 215 twice in the recent past, the controller 160 can be configured to determine that the transporter 120 is leaving the container 112. Otherwise, the controller 160 can determine that the transporter 120 is entering the container 112. In other words, the determination at block 220 may assume that odd-numbered determinations from block 215 indicate entry into the container 112, and even-numbered determinations from block 215 indicate exit from the container 112.

In other examples, the controller 160 can implement a mechanism for detecting direction of travel that does not rely on the assumption above that every second transition indicates that the transporter 120 has exited the container 112. Specifically, the controller 160 can employ the predefined orientation and other characteristics of the sensor 156, as well as the predefined configuration of the beacons 164, to determine a direction of travel based on sequences of beacon signals.

Figure 5:
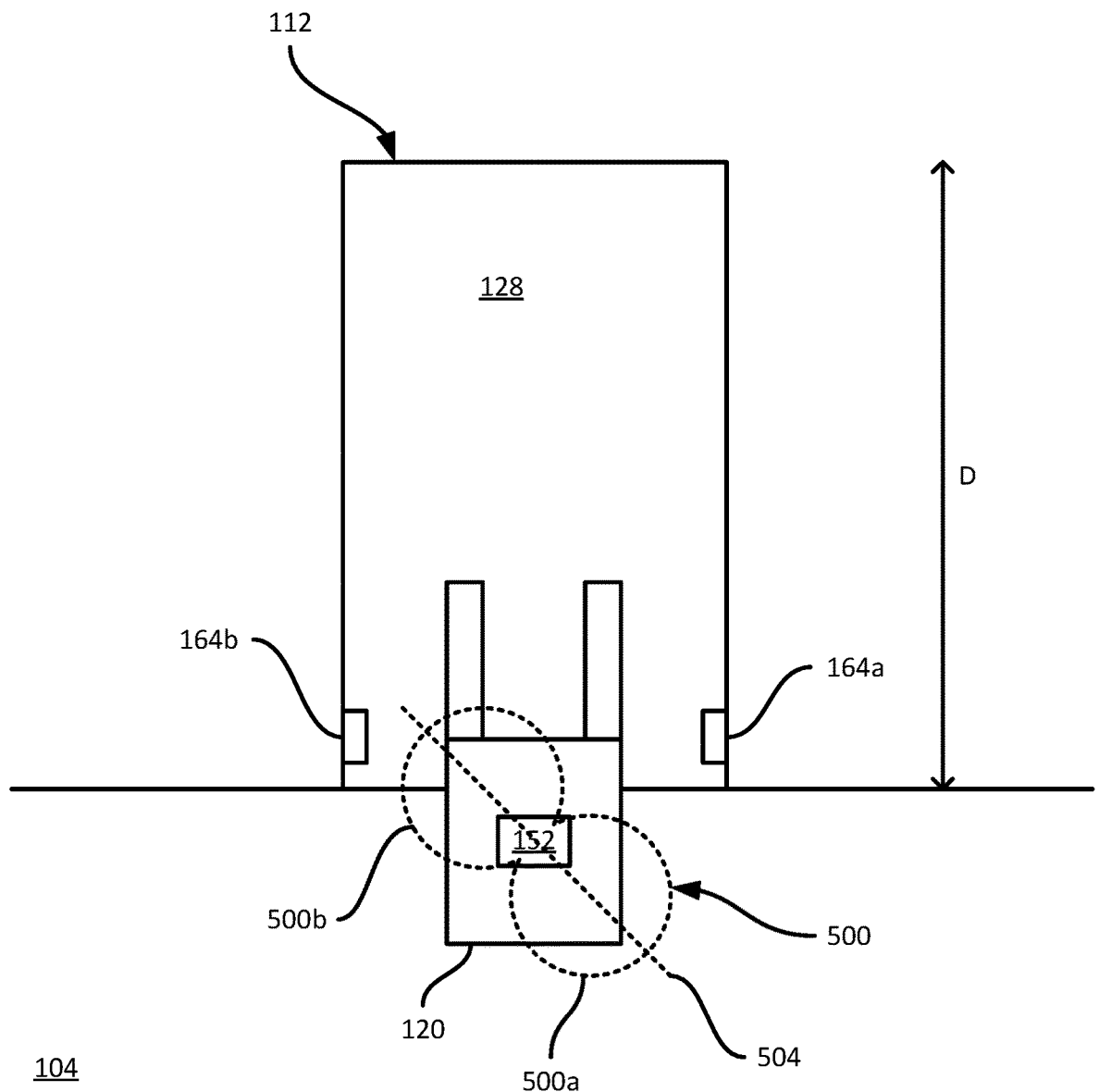
FIG. 5 is a diagram illustrating an example implementation of a sensor for determining a direction of travel at block 220 of the method of FIG. 2.

Turning to FIG. 5, the transporter 120 is shown in the same position relative to the container 112 as in FIG. 4, and with a radiation pattern 500 of the sensor 156. For example, the sensor 156 can include an antenna whose radiation pattern 500 includes first and second lobes 500*a* and 500*b*, indicating areas of greater sensitivity to incoming beacon signals. Further, the antenna is oriented on the transporter 120 such that the lobes 500 are angled relative to a line extending between the beacons 164, as indicated by a longitudinal axis 504 extending through the lobes 500. In the illustrated example, the lobes 500 are angled at about 45 degrees relative to the beacons 164, although other angles may also be employed. More generally, the lobes 500 can be oriented such that when the transporter 120 traverses the boundary between the interior 128 of the container 112 and the facility 104, the signal strength of signals from the beacons 164 increase and decrease at different times. By maintaining a profile of the proximity indicators corresponding to each beacon 164, the controller 160 can determine whether the transporter 120 is traveling into or out of the container 112.

Figure 6:
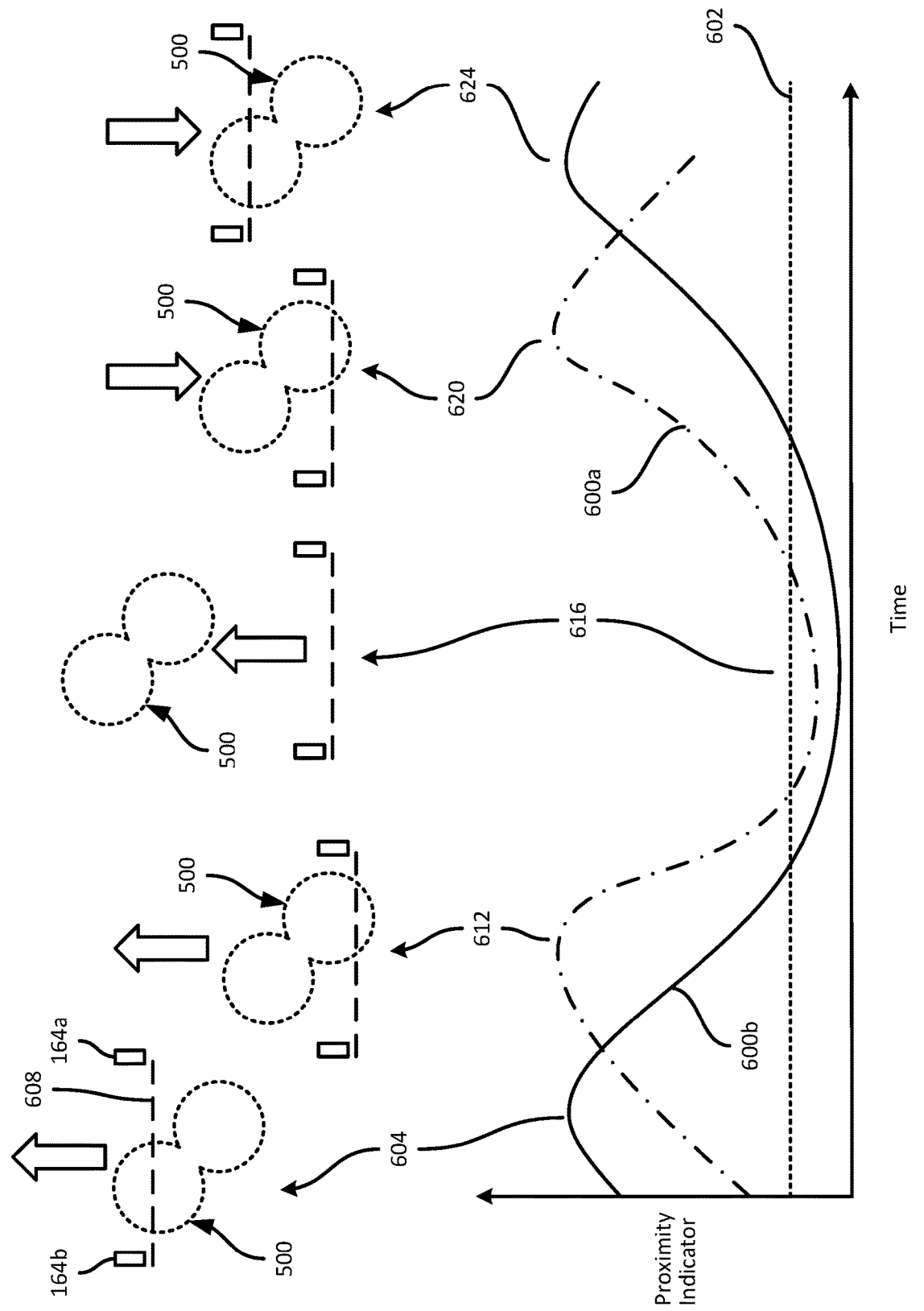
FIG. 6 is a plot of proximity indicators over time illustrating the determination of direction of travel at block 220 of the method of FIG. 2.

Referring to FIG. 6, a plot of proximity indicators (e.g. RSSI values) over time is illustrated, with the solid line 600*b* corresponding to the beacon 164*b*, and the dash-dotted line 600*a* corresponding to the beacon 164*a*. Over the time represented by the plot in FIG. 6, the transporter moves from the position shown in FIG. 4, into the container 112, and then back out of the container 112. A number of schematics illustrate positions of the radiation pattern 500 of the sensor 156 relative to the beacons 164 at various points in time, to illustrate the determination at block 220. The proximity threshold 602 mentioned above is also illustrated.

The schematic 604 illustrates that as the transporter 120 approaches the boundary 608 between the container 112 and the facility 104, the proximity indicator for the beacon 164*b* peaks, while the proximity indicator for the beacon 164*a* has not yet peaked, although both indicators are above the proximity threshold (resulting in an affirmative determination at block 215). The schematic 612 shows that as the transporter 120 fully enters the container 112, the proximity indicator for the beacon 164*b* falls while the proximity indicator for the beacon 164*a* peaks, as a result of the orientation of the lobes 500*a* and 500*b* of the radiation pattern 500 relative to the beacons 164. The order of the peaks at 604 and 612 (i.e. proximity indicator for the beacon 164*b* peaking first) can result in a determination, at block 220, that the direction of travel is into the container 112.

The schematic 616 shows that as the transporter 120 travels further into the container 112, both beacons 164 are sufficiently distant from the sensor 156 that the proximity indicators fall below the threshold. The schematics 620 and 624 show that as the transporter 120 backs out of the container 112, the proximity indicators for the beacons 164*a* and 164*b* peak in the opposite order from the order seen as the transporter 120 entered the container 112. Thus, in a subsequent performance of block 220, the controller 160 can determine that a peak of the proximity indicator for the beacon 164*a*, followed by a peak of the proximity indicator for the beacon 164*b*, indicates a direction of travel out of the container 112.

Returning to FIG. 2, after determining the direction of travel at block 220, the controller 160 can generate a transition event, for transmission to the server 124 via the network 140. The transition event includes the identifiers of the beacons 164 resulting in the affirmative determination at block 215, as well as an identifier of the edge device 152 itself. The transition event also indicates the direction of travel determined at block 220 (i.e. whether the transition is an entry or an exit of the container 112).

The server 124, upon receipt of the transition event, determines at block 230 whether to initiate any auxiliary processes. A wide variety of auxiliary processes may be initiated in response to the transition event, such as pausing allocation of an additional transporter to the container 112 in response to an entry event, providing a further task to the transporter 120 in response to an exit event, and the like. In some examples, the server 124 can determine at block 230 whether the initiate a fullness estimation process, which involves activating the sensor assembly 148-2 to collect and process image and/or depth data. The determination at block 230 can be, for example, whether the transition event indicates that the transporter 120 has exited the container 112, meaning that the view of interior 128 by the sensor assembly 148-2 is unobstructed.

When the determination at block 230 is negative, the performance of the method 200 can return to block 205 for detection of further beacon signals. When the determination at block 230 is affirmative, the server 124 can be configured to initiate one or more auxiliary processes. For example, the server 124 can be configured to activate the sensor assembly 148-2 and begin a fullness estimation process for the container 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
    obtaining, from a sensor disposed on a transporter, a set of beacon identifiers and proximity indicators, the beacon identifiers emitted by respective beacons mounted proximate to a boundary separating an exterior of a container from an interior of the container;
    determining whether the set of beacon identifiers and proximity indicators indicates a transition of the transporter across the boundary;
    when the determination is affirmative, detecting, based on the set of beacon identifiers and proximity indicators, a direction of travel of the transporter relative to the boundary;
    generating a transition event including an identifier of the transporter, an identifier of the container, and the direction of travel; and
    determining, based on the transition event, whether to initiate an auxiliary process associated with the container.

2. The method of claim 1, further comprising providing the transition event to a scheduling controller.

3. The method of claim 1, wherein obtaining the beacon identifiers and proximity indicators includes detecting beacon signals at a sensor, and providing the beacon signals to a controller mounted to the transporter.

4. The method of claim 1, wherein obtaining the beacon identifiers and proximity indicators includes receiving the beacon identifiers and proximity indicators at a server containing a controller, from an edge device including the sensor.

5. The method of claim 1, wherein initiating the auxiliary process includes activating an image sensor to capture images of the interior of the container, for detection of a fullness level of the container.

6. The method of claim 1, wherein determining whether the set of beacon identifiers and proximity indicators indicates a transition of the transporter across the boundary includes:

selecting a subset of the beacon identifiers with proximity indicators meeting a proximity threshold; and determining whether the subset includes a number of beacon identifiers meeting a count threshold.

7. The method of claim 1, wherein detecting the direction of travel includes:

obtaining a sequence of proximity indicators corresponding to each of the beacon identifiers; and comparing peaks in the sequences.

8. The method of claim 1, wherein the beacons are mounted on walls of the container.

9. The method of claim 1, wherein the beacons are mounted on walls of a load bay configured to accept the container.

10. A computing device, comprising:

a controller configured to:

obtain, from a sensor disposed on a transporter, a set of beacon identifiers and proximity indicators, the beacon identifiers emitted by respective beacons mounted proximate to a boundary separating an exterior of a container from an interior of the container;

determine whether the set of beacon identifiers and proximity indicators indicates a transition of the transporter across the boundary;

when the determination is affirmative, detect, based on the set of beacon identifiers and proximity indicators, a direction of travel of the transporter relative to the boundary;

generate a transition event including an identifier of the transporter, an identifier of the container, and the direction of travel; and determine, based on the transition event, whether to initiate an auxiliary process associated with the container.

11. The computing device of claim 10, further comprising a communications interface; the controller configured to transmit the transition event to a second computing device via the communications interface.

12. The computing device of claim 10, further comprising the sensor; wherein the controller is configured to obtain the beacon identifiers and proximity indicators by receiving detected beacon signals from the sensor.

13. The computing device of claim 10, further comprising a communications interface; wherein the controller is configured to obtain the beacon identifiers and proximity indicators by receiving the beacon identifiers and proximity indicators from an edge device including the sensor.

14. The computing device of claim 10, wherein the controller is configured to initiate the auxiliary process by activating an image sensor to capture images of the interior of the container, for detection of a fullness level of the container.

15. The computing device of claim 10, wherein the controller is configured to determine whether the set of beacon identifiers and proximity indicators indicates a transition of the transporter across the boundary by:

selecting a subset of the beacon identifiers with proximity indicators meeting a proximity threshold; and determining whether the subset includes a number of beacon identifiers meeting a count threshold.

16. The computing device of claim 10, wherein the controller is configured to detect the direction of travel by:

obtaining a sequence of proximity indicators corresponding to each of the beacon identifiers; and comparing peaks in the sequences.

17. A system, comprising:

a plurality of beacons mounted proximate to a boundary separating an exterior of a container from an interior of the container;

a sensor mounted to a transporter; and a controller coupled to the sensor and configured to:

obtain, from the sensor mounted to the transporter, a set of beacon identifiers and proximity indicators, the beacon identifiers emitted by the beacons;

determine whether the set of beacon identifiers and proximity indicators indicates a transition of the transporter across the boundary;

when the determination is affirmative, detect, based on the set of beacon identifiers and proximity indicators, a direction of travel of the transporter relative to the boundary; and generate a transition event including an identifier of the transporter, an identifier of the container, and the direction of travel; and a server configured to receive the transition event, and to determine, based on the transition event, whether to initiate an auxiliary process associated with the container.

18. The system of claim 17, further comprising an edge computing device containing the sensor and the controller.

19. The system of claim 17, wherein the server is configured to initiate the auxiliary process by activating an image sensor to capture images of the interior of the container, for detection of a fullness level of the container.

20. The system of claim 17, wherein the beacons are mounted on walls of the container.

21. The system of claim 17, wherein the beacons are mounted on walls of a load bay configured to accept the container.

* * * * *